United States Patent
Shiau

[19]

[11] Patent Number: 5,823,871
[45] Date of Patent: Oct. 20, 1998

[54] INTERFACE CONTROL DEVICE FOR USE WITH TV GAME EQUIPMENT

[75] Inventor: Juh-Gua Shiau, Hsin Chu, Taiwan

[73] Assignee: Holtek Microelectronics, Inc., Hsin Chu, Taiwan

[21] Appl. No.: 555,094

[22] Filed: Nov. 8, 1995

[51] Int. Cl.$^6$ ................................................. A63F 9/24
[52] U.S. Cl. ......................................................... 463/1
[58] Field of Search ..................... 348/448, 456; 463/1, 31; 273/148 B; 364/410

[56] References Cited

U.S. PATENT DOCUMENTS

| | | | |
|---|---|---|---|
| 3,757,038 | 9/1973 | Jannery et al. | 348/456 |
| 4,814,873 | 3/1989 | Maekawa | 348/448 |

*Primary Examiner*—Jessica Harrison
*Assistant Examiner*—Michael O'Neill
*Attorney, Agent, or Firm*—W. Wayne Liauh

[57] ABSTRACT

An interface control device to be mounted between a TV game equipment and a PC interface card. The interface control device includes three main signal generating circuits and an address decoding circuit to process various signals and send a data-transmission acknowledgment signal to an expansion slot of the TV game equipment such that signals generated from the expansion slot interface of a TV game equipment can be converted into signals recognizable by the PC standard bus interface so as to allow the TV game equipment to directly access data via an interface card originally inserted on a PC standard bus, and enhance the utilizability of the expansion slot interface of the current TV game equipment.

1 Claim, 13 Drawing Sheets

5,823,871

INTERFACE CONTROL DEVICE FOR USE WITH TV GAME EQUIPMENT

BACKGROUND OF THE INVENTION

Generally speaking, the main function of the current TV game equipment is to execute one or more computer game software programs. The system of such TV game equipment has already included a CPU, memory, and input/output ports. In other words, these components contained in a TV game equipment are similar to those contained in a PC structure. Therefore, if direct access of data can be done between a TV game equipment interface and a standard interface card to be connected to a PC ISA bus, the value of the expansion slot interface of a TV game equipment will be increased considerably. In other words, the TV game equipment can use many ISA bus interface cards easily and directly.

SUMMARY OF THE INVENTION

The prime object of the present invention is to provide an interface control device to be mounted between the expansion slot interface of a TV game equipment and a PC interface card to serve as a bridge between them, so as to allow a TV game equipment to directly use a considerable number of ISA bus interface cards to thereby increase the value of the expansion slot interface of the TV game equipment.

DETAILED DESCRIPTION

Figure 1:
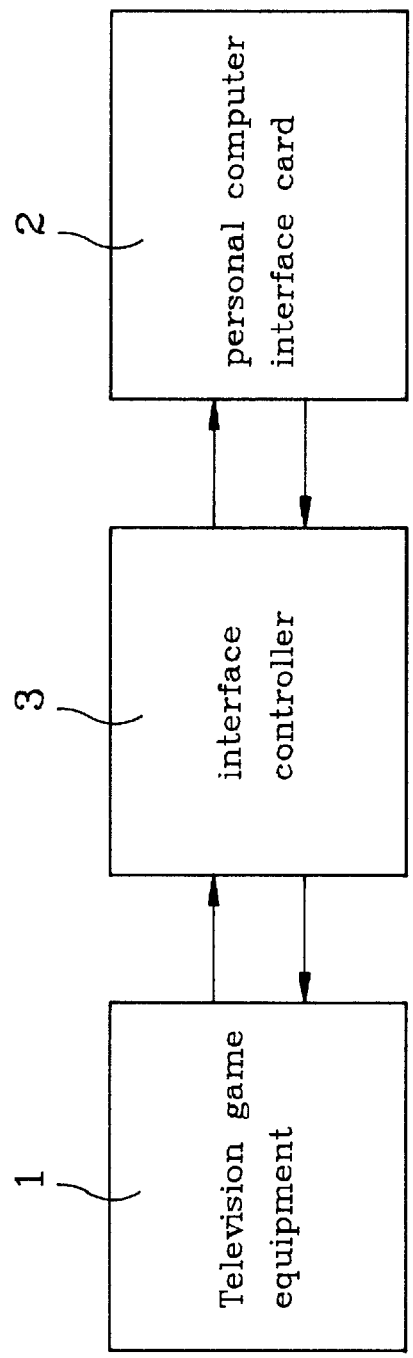
FIG. 1 is a brief block diagram of the present invention.
Figure 2:
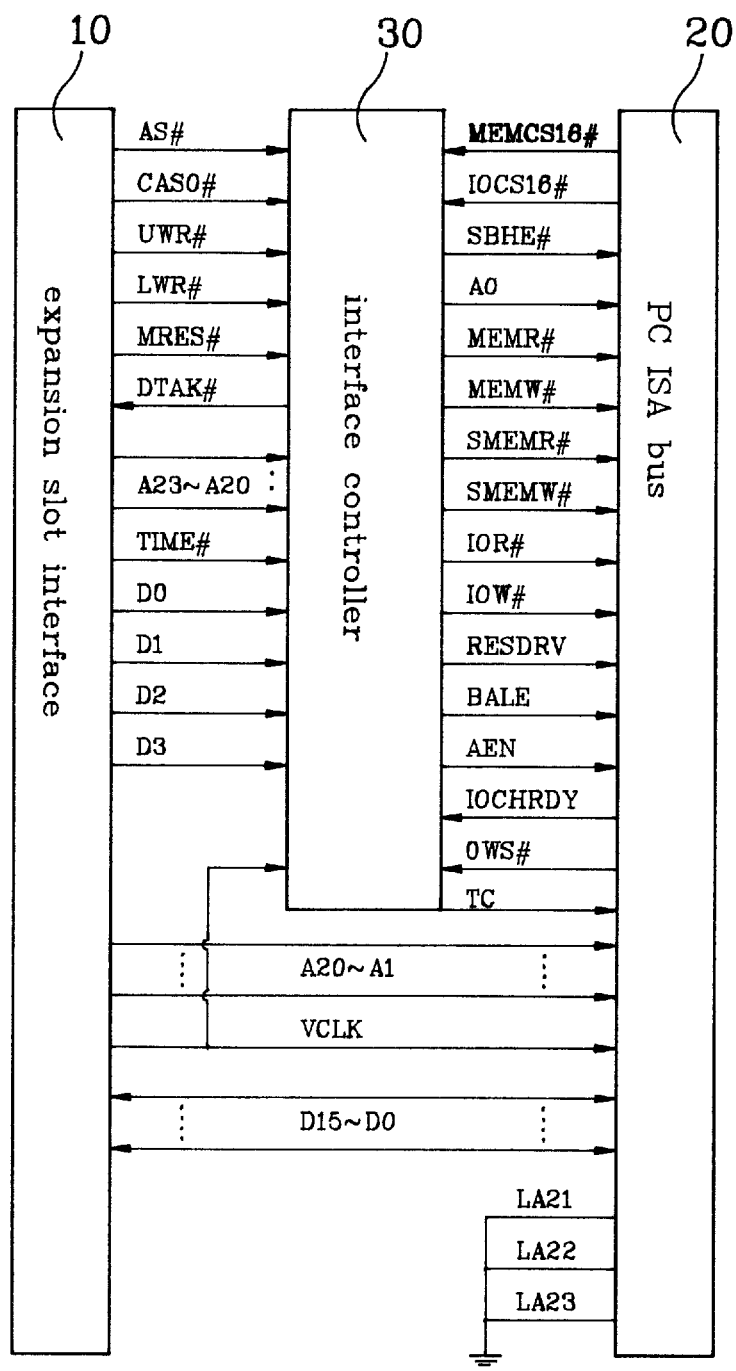
FIG. 2 is a block diagram of an embodiment according to the present invention.

Referring now to FIG. 1, the present invention is shown with a block diagram, in which an interface controller 3 is installed between a TV (television) game equipment 1 and a PC interface card 2 so as to enable the TV game equipment 1 to operate the PC (personal computer) interface card 2 through the interface controller 3. As shown in FIG. 2, an embodiment of the present invention shows that the signals associated with the expansion slot interface 10 of a TV game equipment can be converted into interface signals recognizable by the PC ISA bus 20. This conversion is to be done by means of an interface controller 30 disclosed in the present invention. In accordance with the state of the interface signals of the PC ISA bus 20, a data-transmission acknowledgment signal DTAK # will be sent to the expansion slot interface 10 of the TV game equipment for control.

Figure 3:
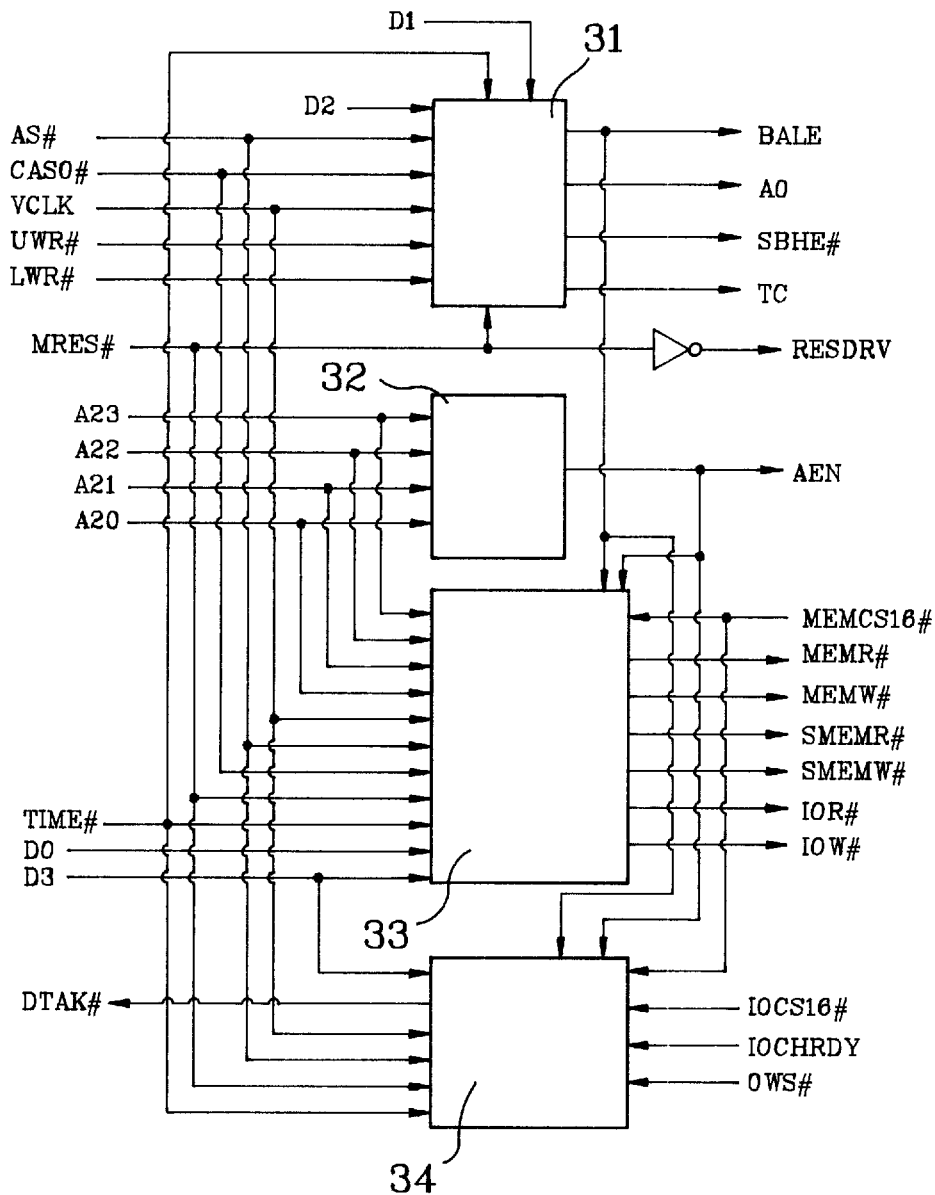
FIG. 3 is a block diagram of a circuit of the embodiment according to the present invention.

FIG. 3 is a block diagram of a circuit of a preferred embodiment according to the present invention. The interface controller 30 as shown in FIG. 2 includes: (a) a signal generating circuit 31 for generating address-latching signal, high-and-low byte selecting signals, and a terminating count signal, (b) an address decoding circuit 32, (c) a signal generating circuit 33 for generating read/write signals to a memory and an input/ output port, and (d) a signal generating circuit 34 for generating a data-transmission acknowledgment signal. Except for the data-transmission acknowledgment signal DTAK#, which is generated by the signal generating circuit 34 in accordance with the interface signal state of the PC ISA bus 20, and sent to the expansion slot interface 10 of the TV game equipment, the rest of the signals will be converted into PC ISA bus 20 interface signals through the expansion slot interface 10 of the TV game equipment. FIG. 3 also shows that an address-latching signal (BALE), a high-and-low byte selecting signal (SBHE#), and a terminating count (TC) signal are sent to a standard PC interface card connected to a standard PC bus.

FIGS. 4 to 23 illustrate timing diagrams of the various conditions of the various embodiments respectively according to the present invention. These timing diagrams are useful for showing the conversion logic of the various signals of the interface controller 30 of the embodiments according to the present invention.

Figure 4:
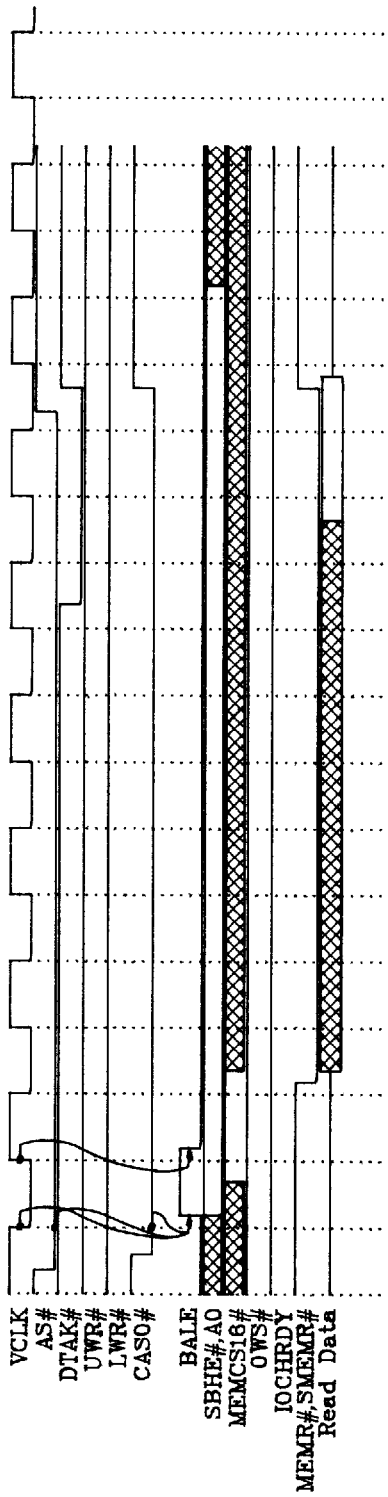
FIG. 4 is a standard cycletiming diagram for reading a 8-bit memory according to the present invention.

As shown in FIG. 4, the standard cycletiming diagram for reading an 8-bit memory according to the present invention shows that when the expansion slot interface 10 of the TV game equipment starts the standard cycle to read a data from a 8-bit memory on an interface card of the PC ISA bus 20, the high-byte writing signal UWR# and the low-byte writing signal LWR# of the expansion slot interface 10 of the TV game equipment are in high potential, while the output-enabling signal CAS0# thereof is in low potential. The aforesaid signals together with a low-potential address strobing signal AS# and a clock signal VCLK generate an address-latching signal BALE for the PC ISA bus 20. The address-latching signal BALE is a half-cycle pulse for latching the address bus. The address line A0 may be generated by means of the selective control signal TIME# and the data line D1 first so as to determine whether an odd or even byte is to be read. The 16-bit memory selecting signal MEMCS16# is in high potential to indicate that the 8-bit memory is transmitting data. Likewise, memory read-in signals MEMR# and SMEMR# can also be generated. When the memory read signal MEMR# and SMEMR# are in low potential, the CPU instructs the memory to [set a] send data via lines D7–D0 of the data bus. The signal MEMR# can perform reading operation with respect to all the memory space, while signal SMEMR# can only operate within the memory space wherein the address is lower than 1 MB(megabyte). When the input/output channel ready signal IOCHRDY and the zero-wait signal 0WS# are in high potential, and after the address-latching signal BALE has been generated, the data-transmission acknowledgement signal DTAK# sent to the expansion slot interface 10 interface of the TV game equipment will be changed from a high potential to a low potential; this indicates that the memory has sent out data via lines D7–D0 of the data bus.

Figure 5:
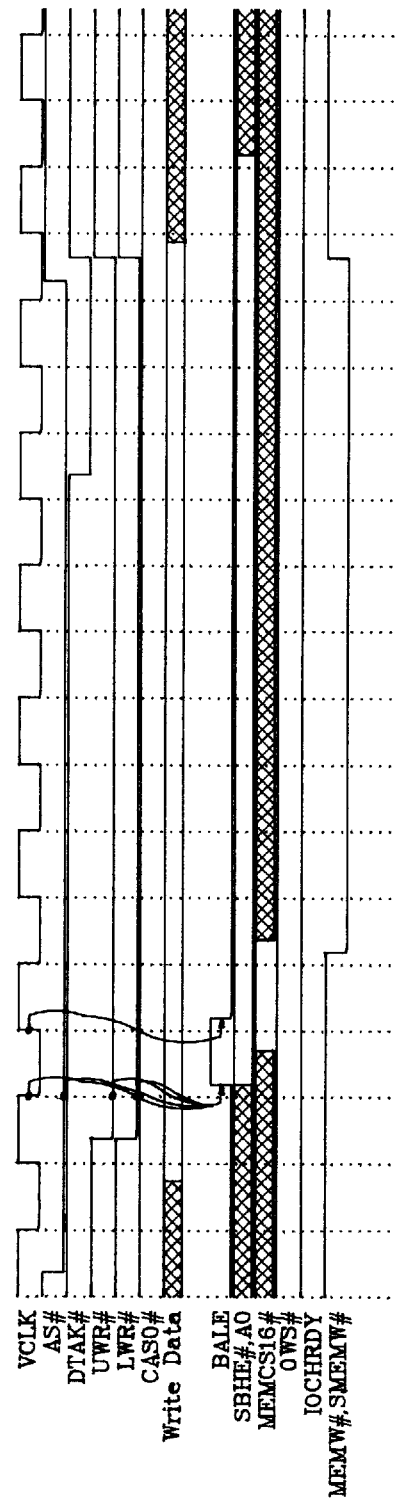
FIG. 5 is a standard cycletiming diagram for writing in a 8-bit memory according to the present invention.

FIG. 5 illustrates a standard cycle timing diagram in accessing a 8-bit memory. More particularly, FIG. 5 illustrates a data writing timing diagram when accessing an 8-bit memory wherein the expansion slot interface 10 of the TV game equipment performs a writing operation to the interface card of the PC ISA bus 20. The differences between FIG. 5 and FIG. 4 are that the high-byte writing signal UWR# of the expansion slot interface 10 of the TV game equipment and the low-byte writing signal LWR# are changed from a high potential into a low potential; the output-enabling signal CASO# is in a high potential; and the address stobing signal AS# is in a low potential. By means of the aforesaid signals and the cycle of the clock signal VCLK, a number of signals, such as an address-latching signal BALE, an address line signal A0 and memory writing signals MEMW# and SMEMW#, can be generated individually. This causes the memory to store the data transmitted on data bus D7–D0. Signal MEMW# can operate within all the memory space, while signal SMEMW# can operate only within addresses lower than 1 MB in the memory space. When the data-transmission acknowledgment signal DTAK# of the expansion slot interface 10 of the TV game equipment is changed from a high potential to a low potential, this indicates that data has been written into the memory.

Figure 6:
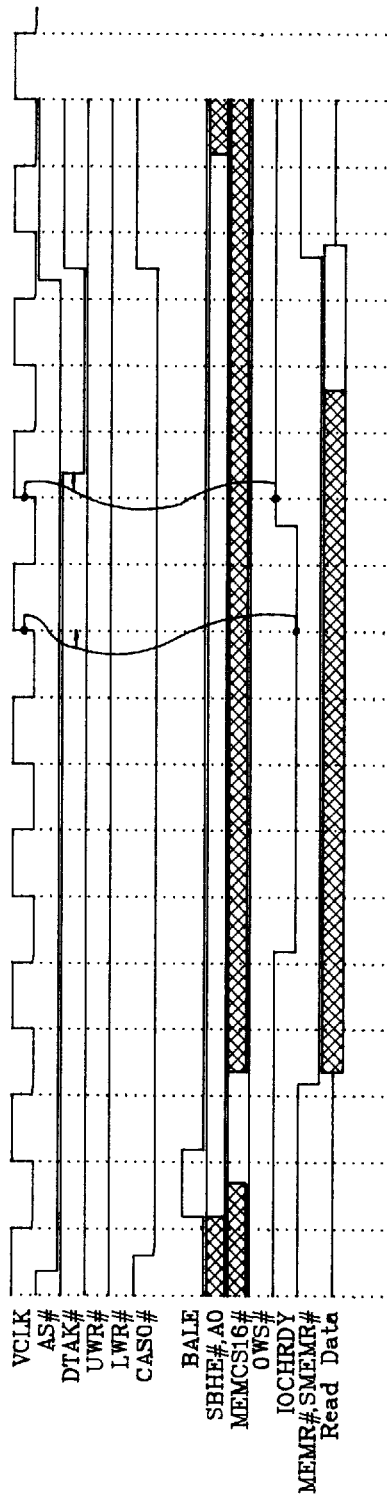
FIG. 6 is an insert-wait-state timing diagram for reading a 8-bit memory according to the present invention.
Figure 7:
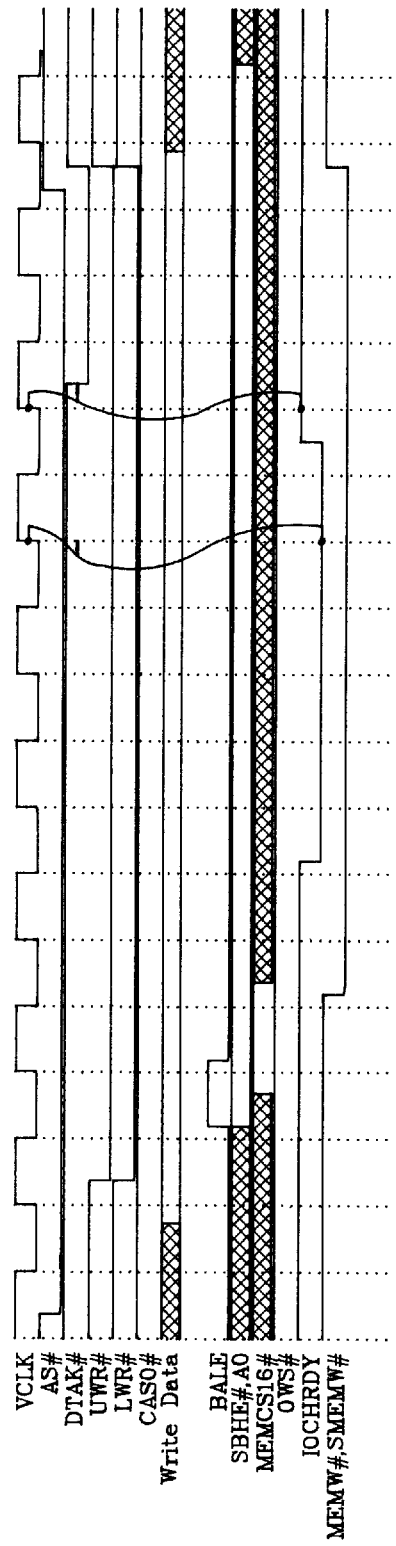
FIG. 7 is an insert-wait-state timing diagram for writing in a 8-bit memory according to the present invention.
Figure 8:
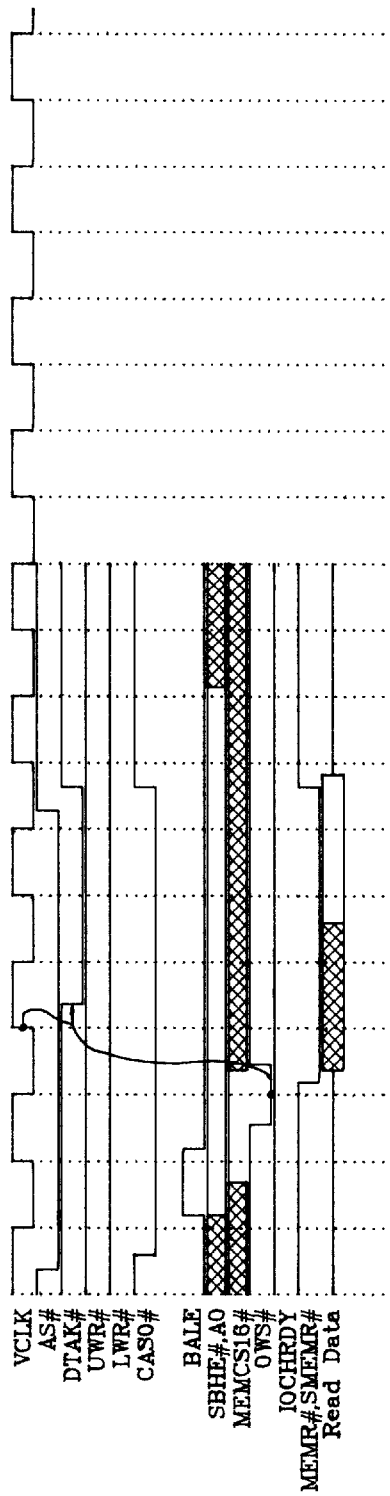
FIG. 8 is a zero-wait-state timing diagram for reading a 8-bit memory according to the present invention.
Figure 9:
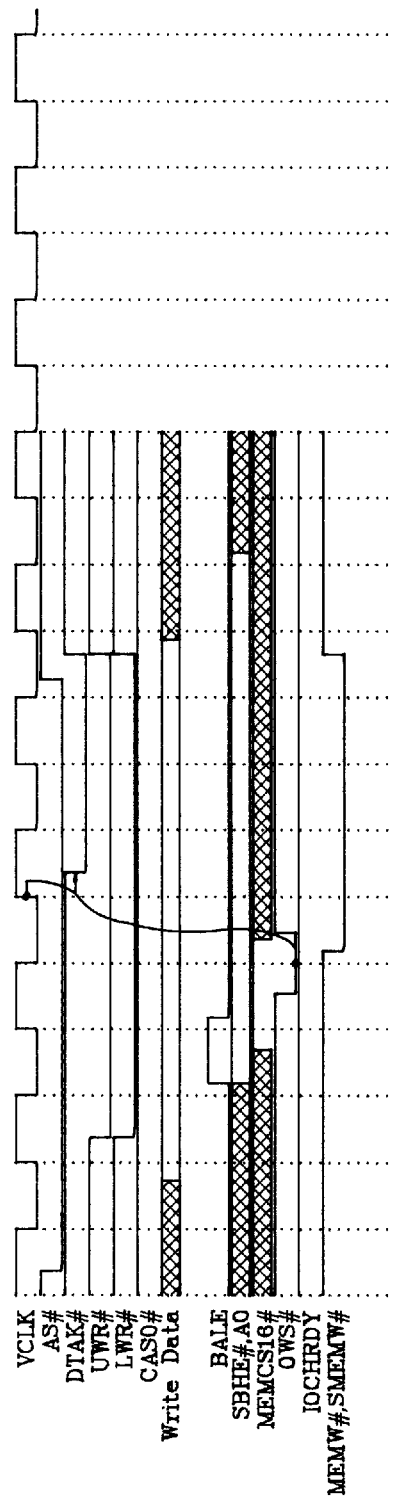
FIG. 9 is a zero-wait-state timing diagram for writing in a 8-bit memory according to the present invention.

FIGS. 6 and 7 illustrate an insert-wait-state timing diagram for reading from an 8-bit memory, and an insert-wait-state timing diagram for writing into an 8-bit memory, respectively according to the present invention. The difference between the FIGS. 6 to 7 and the FIGS. 4 to 5 is that the input/output channel ready signal IOCHRDY of the PC ISA bus 20 can change from a high potential to a low potential during a given period of time. When signal IOCHRDY is in a low potential, the CPU will experience a wait cycle to cause the reading or writing cycle of the memory to become longer than usual. FIGS. 8 to 9 illustrate a zero-wait-state timing diagram for reading an 8-bit memory and a zero-wait-state timing diagram for writing into an 8-bit memory, respectively, according to the present invention. The difference between the FIGS. 8 to 9 and the FIGS. 4 to 5 is that the zero-wait-state signal 0WS# of the PC ISA bus 20 can change from a high potential to a low potential during a given period of time. When the signal 0WS# is in a low potential, it indicates that no wait cycle is necessary to be added therein so as to shorten the reading or writing cycle of the memory.

Figure 10:
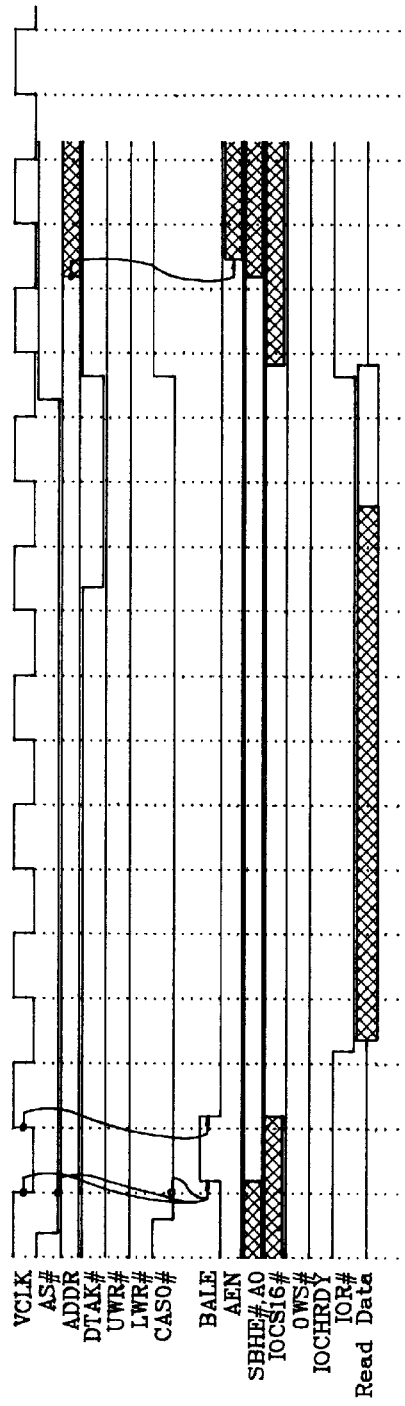
FIG. 10 is a standard cycletiming diagram for reading a 8-bit input/output port according to the present invention.

FIG. 10 is a standard cycletiming diagram for reading from an 8-bit input/output port according to the present invention. The difference between the FIG. 10 and the FIG. 4 (a reading timing diagram involving access to the memory) is that only when the address enabling signal AEN of the PC ISA bus 20 is in a low potential (address between 800000H to 9FFFFFH), the input/output port will perform a decoding operation using address ADDR (i.e., A15–A0). The similarity between FIG. 10 and FIG. 4 is that, by using signal VCLK, signal AS#, signal UWR#, signal LWR# and signal CASO#, the interface controller can generate signal BALE and signal IOR#. When signal IOR# sent to the input/output port is in low potential, it instructs the input/output port to send a data to the data bus D7–D0. When the signal DTAK# is changed from a high potential to a low potential, it indicates that the input/output port has put a data on the lines D7–D0 of the data bus.

Figure 11:
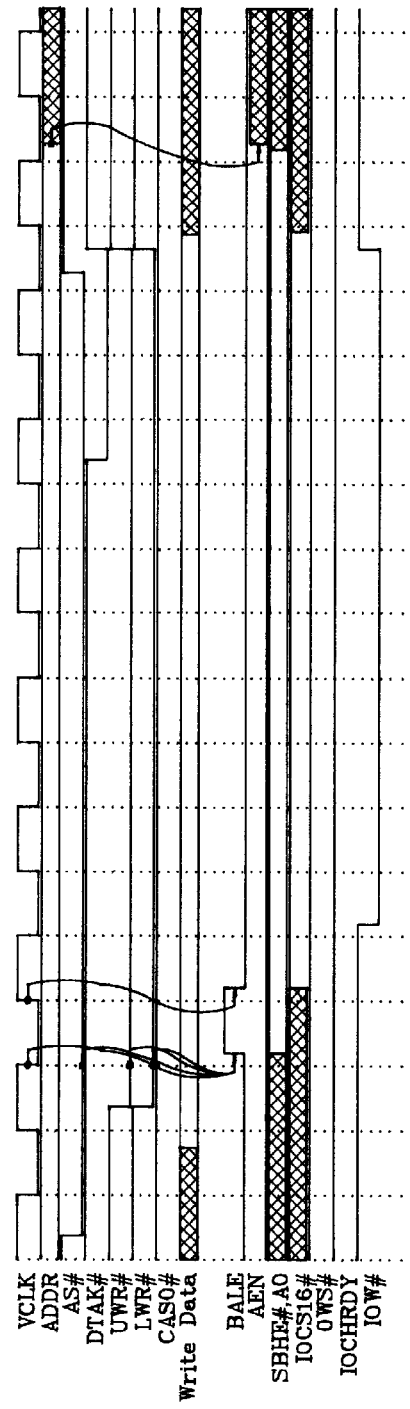
FIG. 11 is a standard cycletiming diagram for writing in a 8-bit input/output port according to the present invention.

FIG. 11 is a standard cycletiming diagram for writing into an 8-bit input/output port according to the present invention. When the writing signal IOW# sent to the input/output port on the interface card of the PC ISA bus 20 is changed from a high potential to a low potential, it instructs the input/output port to leave a data on the data bus D7–D0 written in; the state of the rest of the signals is the same as that of FIG. 10.

Figure 12:
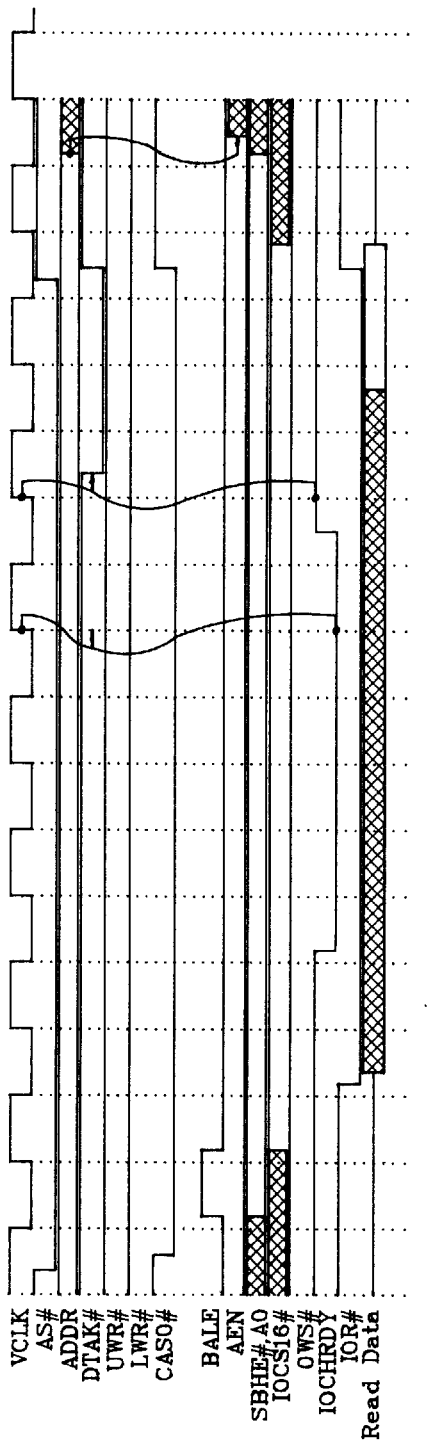
FIG. 12 is an insert-wait-state timing diagram for reading a 8-bit input/output port according to the present invention.
Figure 13:
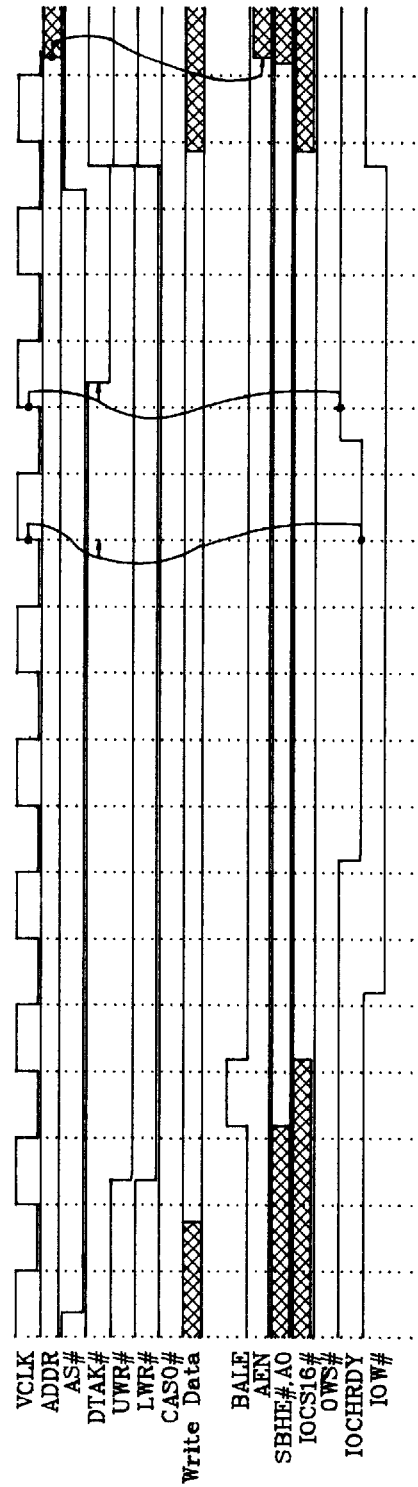
FIG. 13 is an insert-wait-state timing diagram for writing in a 8-bit input/output port according to the present invention.
Figure 14:
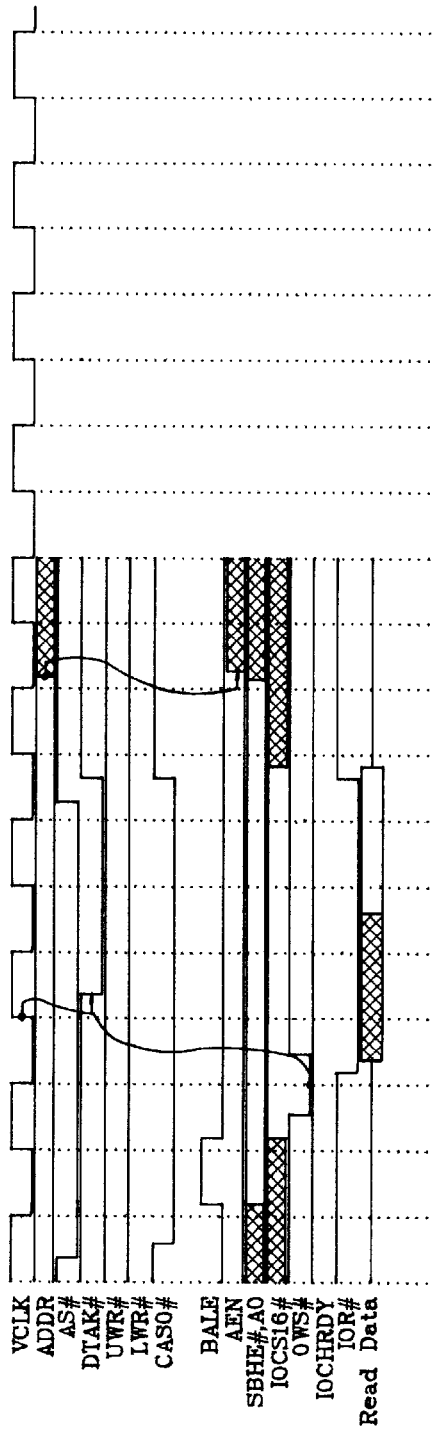
FIG. 14 is a zero-wait-state timing diagram for reading a 8-bit input/output port according to the present invention.
Figure 15:
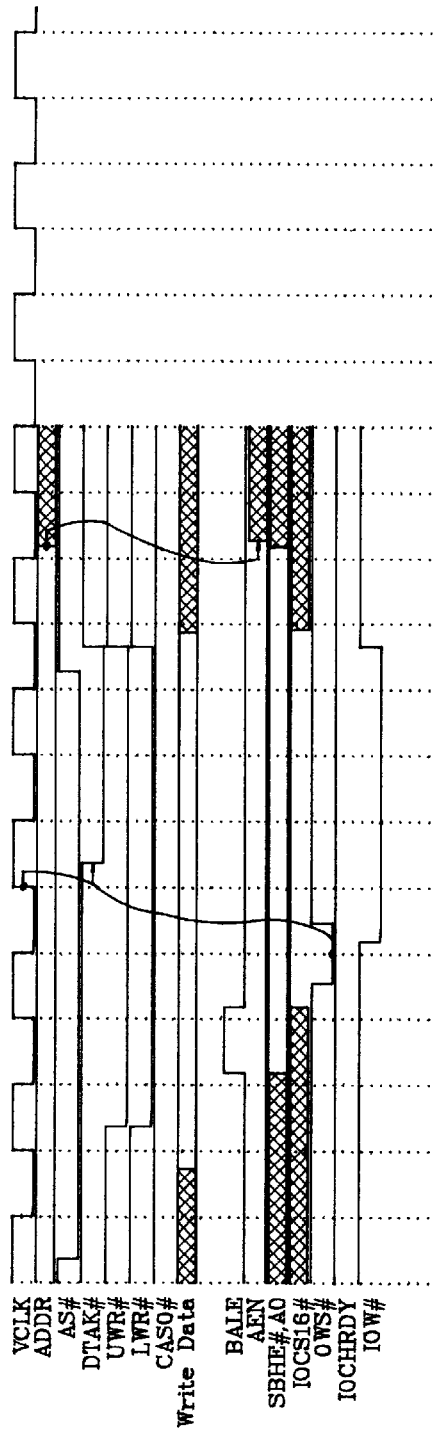
FIG. 15 is a zero-wait-state timing diagram for writing in a 8-bit input/output port according to the present invention.
Figure 16:
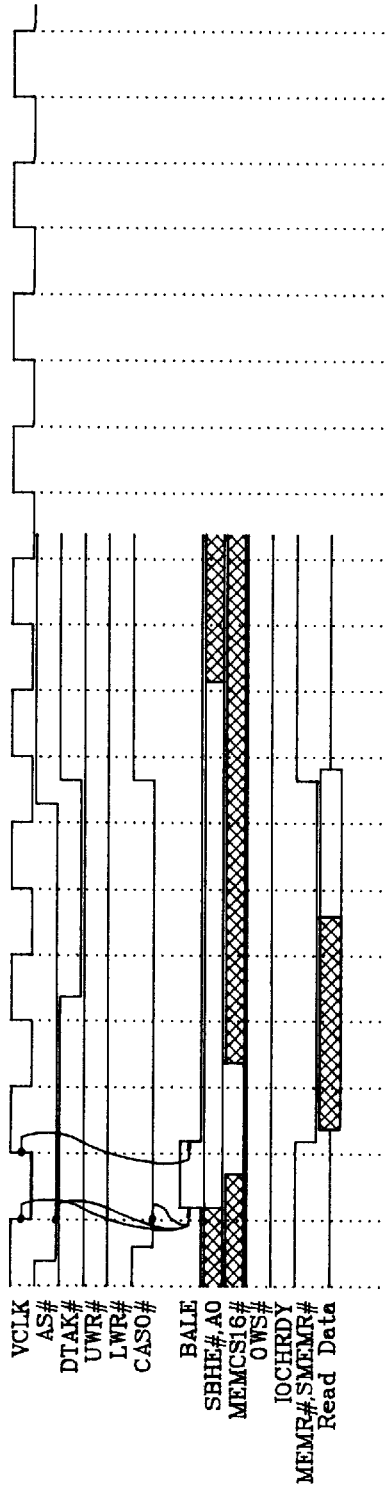
FIG. 16 is a standard cycletiming diagram for reading a 16-bit memory according to the present invention.
Figure 17:
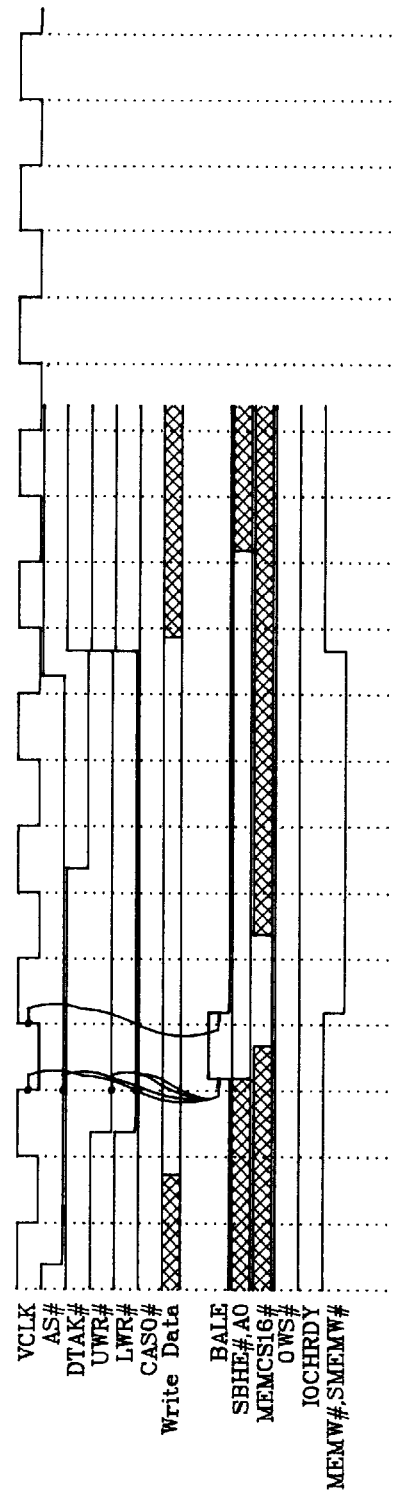
FIG. 17 is a standard cycletiming diagram for writing in a 16-bit memory according to the present invention.
Figure 18:
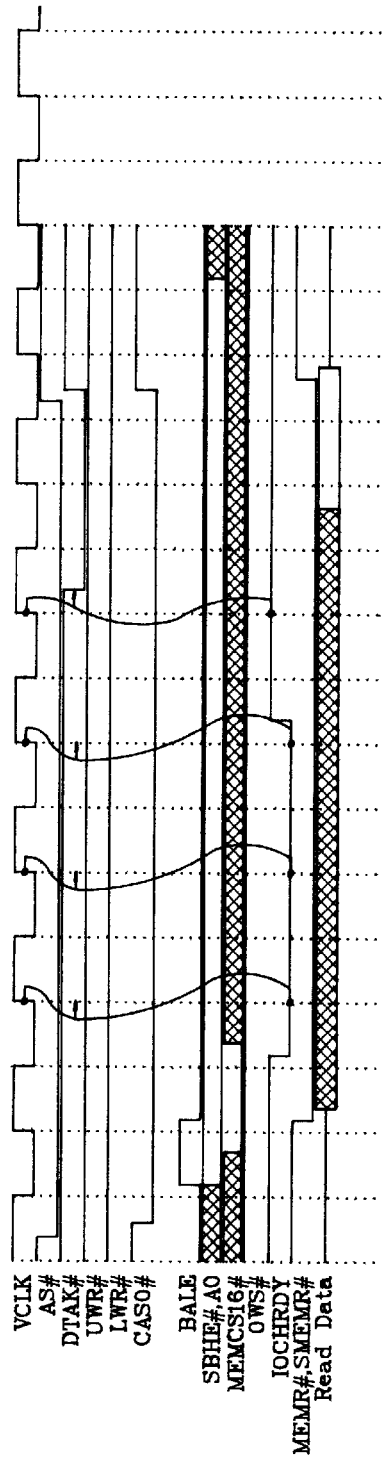
FIG. 18 is an insert-wait-state timing diagram for reading a 16-bit memory according to the present invention.
Figure 19:
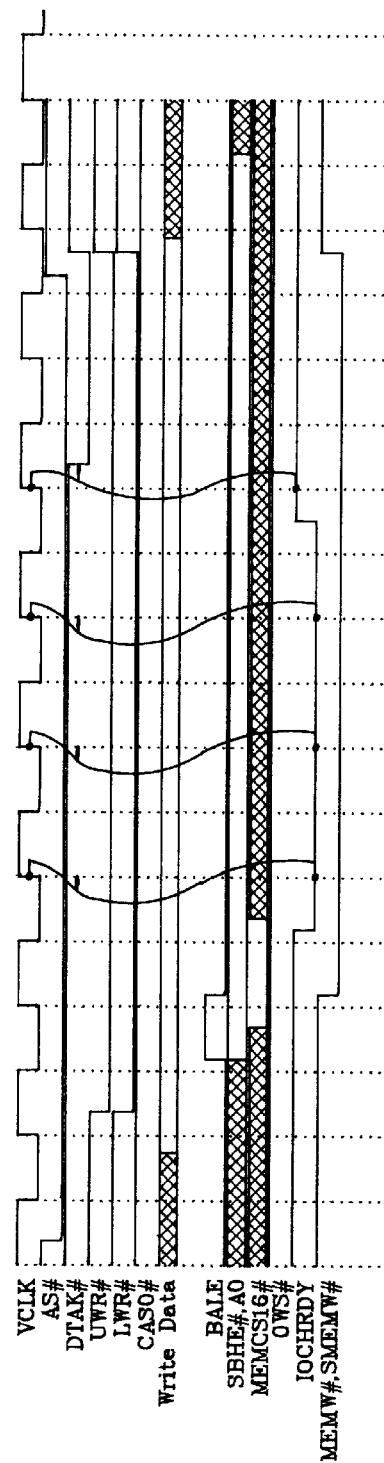
FIG. 19 is an insert-wait-state timing diagram for writing in a 16-bit memory according to the present invention.
Figure 20:
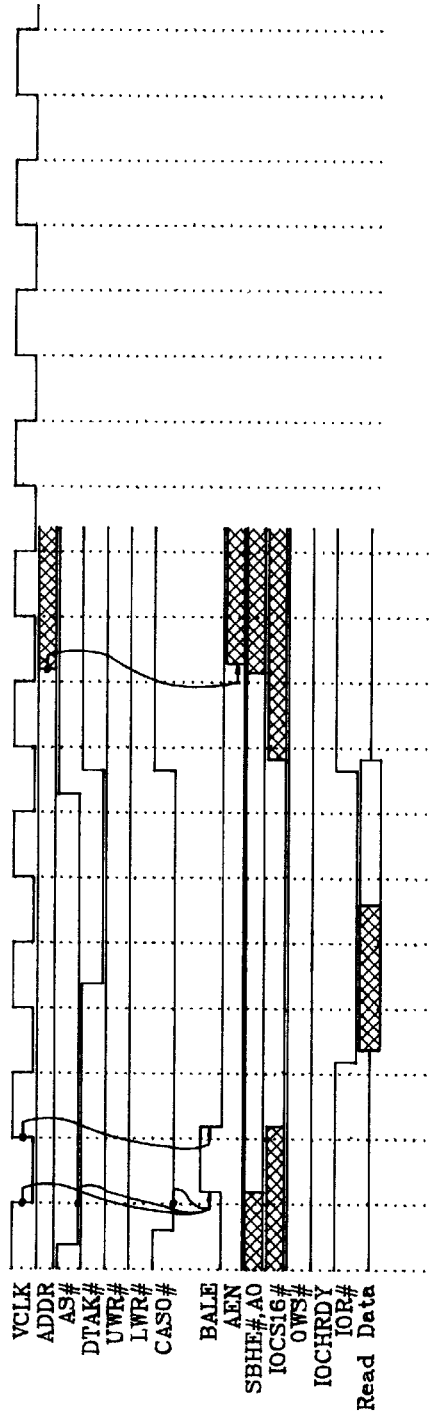
FIG. 20 is a standard cycletiming diagram for reading a 16-bit input/output port according to the present invention.
Figure 21:
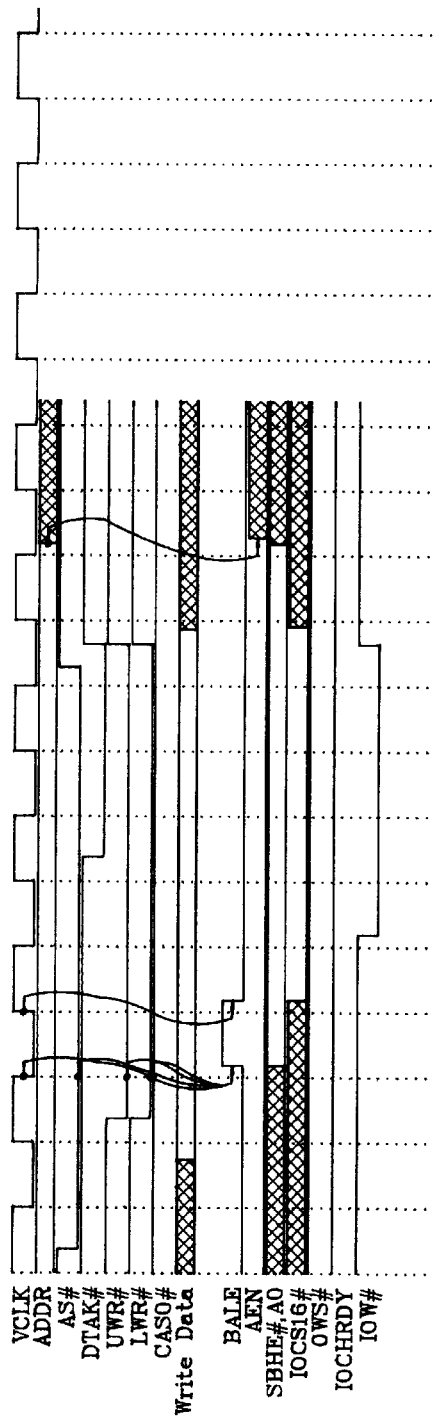
FIG. 21 is a standard cycletiming diagram for writing in a 16-bit input/output port according to the present invention.
Figure 22:
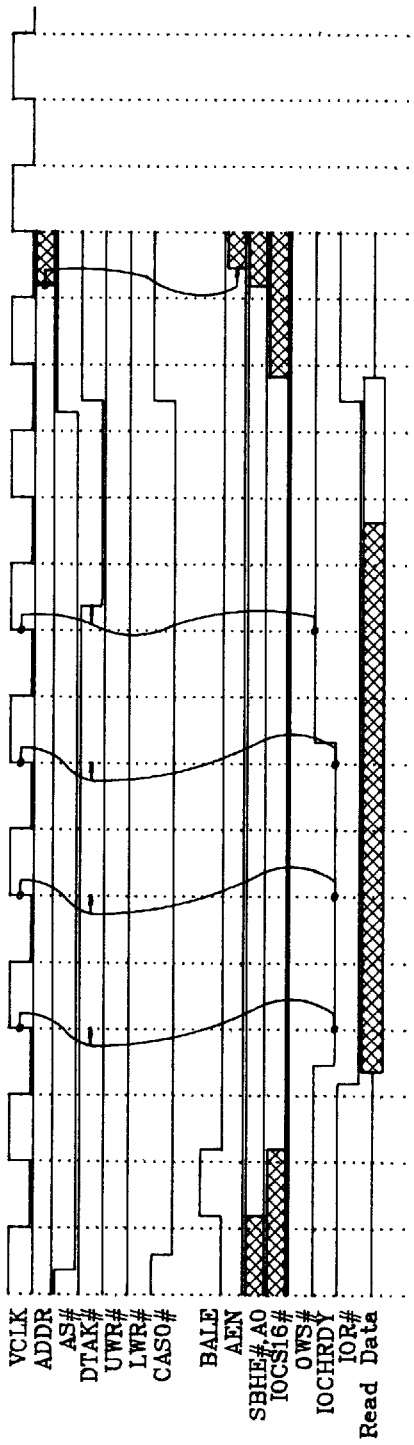
FIG. 22 is an insert-wait-state timing diagram for reading a 16- bit input/output port according to the present invention.
Figure 23:
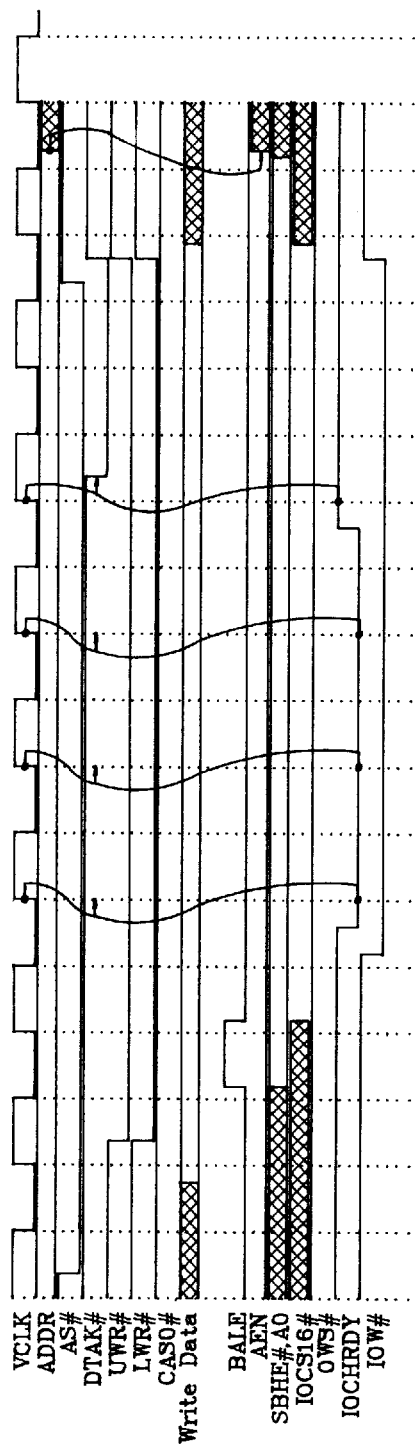
FIG. 23 is an insert-wait-state timing diagram for writing in a 16-bit input/output port according to the present invention.

FIGS. 12 and 13 illustrate an insert-wait-state timing diagram for reading from an 8-bit input/output port, and an insert-wait-state timing diagram for writing into an 8-bit input/output port, respectively, according to the present invention. The input/output channel ready signal IOCHRDY of the PC ISA bus 20 can change from a high potential to a low potential during a given period of time so as to cause the CPU to experience a wait cycle and to cause the reading or writing cycle of the input/output port to become longer than usual. FIGS. 14 and 15 illustrate a zero-wait-state timing diagram for reading from an 8-bit input/output port, and a zero-wait-state timing diagram for writing into an 8-bit input/output port, respectively, according to the present invention. The zero-wait-state signal 0WS# of the PC ISA bus 20 can change from a high potential to a low potential during a given period of time to instruct not to add any wait cycle, so as to shorten the reading or writing cycle of the input/output port.

FIGS. 16 to 23 illustrate the various timing diagrams of involving 16-bit memory and port devices. The difference between the FIGS. 16 to 23 and FIGS. 4 to 15 is that the 16-bit memory selecting signal MEMCS16# of the PC ISA bus 20, and the 16-bit input/output port selecting signal IOCS16# of the PC ISA bus 20 can change from a high potential to a low potential during a given period of time. When signal MEMCS16# and signal IOCS16# operate at a low potential, it indicates that the existing 16-bit memory or the input/output port is transmitting or receiving a data through data lines D15–D0.

By means of the interface controller 30 and the interface control technique, the expansion slot interface 10 signals of the TV game equipment can be converted into the signals required by the interface of the PC ISA bus 20. In accordance with the signal state of the PC ISA bus 20, a data-transmission acknowledgment signal can be generated and sent to the expansion slot interface 10 for control purpose so as to accomplish the timing diagrams shown in FIG. 4 to 23, respectively.

What is claimed is:

1. An interface control device to be installed between a TV game equipment and a standard PC interface card so as to allow the TV game equipment to communicate with the standard PC interface card, comprising:

an expansion slot interface in the TV game equipment for providing address strobing signal output-enabling signal, clock signal, high-and-low byte writing signal, reset signal, selective control signal and data signals including address signals;

a first signal generating circuit connected to said expansion slot of said TV game equipment for receiving the address strobing signal, output-enabling signal, clock signal, high-and-low byte writing signal, reset signal, selective control signal and data signals therefrom, and generating an address-latching signal, a high-and-low byte selecting signal, and a terminating count signal to be sent to a standard PC interface card connected to a standard PC bus;

an address decoding circuit for receiving the address strobing signal and addressing signals from said expansion slot interface of said TV game equipment so as to generate an address enabling signal to be sent to said PC standard bus; only when said address enabling signal being in a low potential, an input/output port of said standard interface card for decoding an address;

a second signal generating circuit for performing read/write operations in a memory and said input/output port of said standard PC interface card, said second signal generating circuit is connected to said expansion slot of said TV game equipment to receive the address signals, address strobing signal, output-enabling signal, clock singal, reset signal selective control signal and data signals from said expansion slot interface of said TV game equipment, said second generating circuit is also connected to said standard PC interface card, said first signal generating circuit, and said address decoding circuit for receiving the address-latching signal, a 16-bit memory selecting signal and said address enabling signal therefrom, and generating memory reading signals, memory writing signals, an input/output port reading signal and an input/output port writing signal to be sent to said standard PC interface card;

a third signal generating circuit connected to said expansion slot of said TV game equipment, said first and second signal generating circuit, said address decoding circuit and said standard PC interface card for generating a data-transmission acknowledgment signal to be sent to said expansion slot of said TV game equipment so as to allow said TV game equipment to access data signals from said standard PC interface card connected to said PC standard bus directly.

* * * * *